United States Patent [19]

Swanson

[11] Patent Number: 4,618,186

[45] Date of Patent: Oct. 21, 1986

[54] CHILD SAFETY RESTRAINT

[76] Inventor: Alfred B. Swanson, 2945 Bonnell SE., Grand Rapids, Mich. 49506

[21] Appl. No.: 691,840

[22] Filed: Jan. 16, 1985

[51] Int. Cl.⁴ .......................................... A47D 15/00
[52] U.S. Cl. .................................. 297/468; 297/485
[58] Field of Search ............... 297/468, 483, 484, 485, 297/464, DIG. 6

[56] References Cited

U.S. PATENT DOCUMENTS

| | | |
|---|---|---|
| 147,354 | 2/1874 | Ambler . |
| 406,330 | 7/1889 | Austin .............................. 297/485 |
| 579,818 | 3/1897 | Cooley ........................... 297/485 X |
| 1,551,932 | 9/1925 | Carver . |
| 2,275,983 | 3/1942 | Nadeau . |
| 2,429,283 | 10/1947 | Veyt . |
| 2,437,585 | 3/1948 | Zimmern . |
| 2,459,545 | 1/1949 | Schultz . |
| 2,741,412 | 4/1956 | Hinkle . |
| 2,758,769 | 8/1956 | Nunn et al. .................... 297/485 X |
| 2,817,393 | 12/1957 | Mitchell ......................... 297/484 X |
| 2,851,033 | 9/1958 | Posey ............................. 297/484 X |
| 2,877,833 | 3/1959 | Boles ............................. 297/484 X |
| 2,888,063 | 5/1959 | Rose . |
| 2,978,015 | 4/1961 | Cox ................................. 297/485 |
| 3,160,143 | 12/1964 | Gray ....................... 297/DIG. 6 X |
| 3,174,798 | 3/1965 | Sprague ............................ 297/485 |
| 3,295,501 | 1/1967 | Riley . |
| 3,313,511 | 4/1967 | Koerner et al. ............. 297/DIG. 6 |
| 3,321,247 | 5/1967 | Dillender . |
| 3,945,678 | 3/1976 | Neuman .......................... 297/485 |
| 4,273,215 | 6/1981 | Leggett . |
| 4,396,091 | 8/1983 | Anderson . |

FOREIGN PATENT DOCUMENTS

| | | | |
|---|---|---|---|
| 255971 | 5/1963 | Australia .............................. 297/408 |
| 447355 | 3/1948 | Canada .............................. 297/485 |
| 1158617 | 12/1983 | Canada .............................. 297/408 |
| 1341240 | 9/1963 | France ................................ 297/408 |
| 2072488 | 10/1981 | United Kingdom ............... 297/483 |

*Primary Examiner*—William E. Lyddane
*Assistant Examiner*—José V. Chen
*Attorney, Agent, or Firm*—Price, Heneveld, Huizenga & Cooper

[57] ABSTRACT

The child restraint of the present invention includes a waistband which is placed around the child. The waistband is retained in that position by hook and napped loop means such as VELCRO. The use of hook and napped loop means permits the waistband to be easily adjusted to fit the size of any particular child. The restraint further includes an elongated strap which is securely attached to the waistband. The strap is adapted to be looped around a suitable anchor, such as the parent's seatbelt or the armrest of the parent's seat. The end of the strap is passed around the fixed object and then threaded through a ring attached to the waistband. The strap is then pulled back across the ring so that it overlaps the portion of the strap projecting toward the ring. The overlapped portions of the strap are secured together by hook and napped loop means such as VELCRO. The device restrains the child from becoming dislodged from his parent's lap during landing and takeoff or when turbulence is encountered.

1 Claim, 5 Drawing Figures

U.S. Patent  Oct. 21, 1986  Sheet 1 of 2  4,618,186
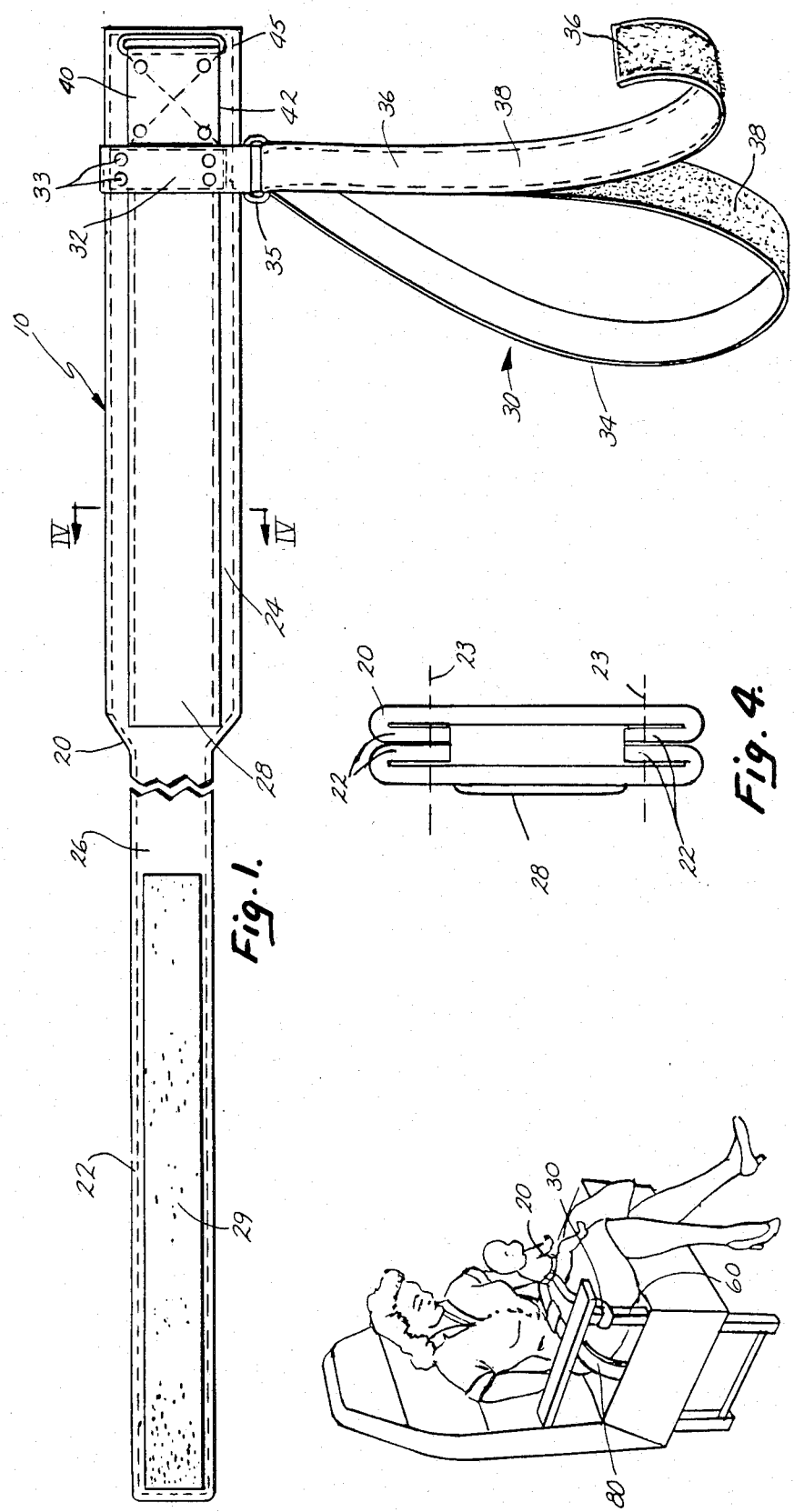

CHILD SAFETY RESTRAINT

BACKGROUND OF THE INVENTION

This invention relates to safety devices for restraining young children in airplanes.

Most commercial airlines do not require children up to the age of two, who are flying with their parents or guardians, to sit in their own airline seat. These young children, commonly referred to in the airlines industry as lap children, are allowed to sit in their parent's lap during take-off, flight and landing without being restrained by a seatbelt or other restraining device.

Sitting in an airline seat without the protection of a seat belt can be quite dangerous for these lap children. It is highly likely that such a child could fall out of his parent's lap, or strike the seat ahead of him, or even bounce up and hit the ceiling or luggage rack if the plane encounters a pocket of turbulence or suddenly loses altitude. A child could be severely injured if such an event occurs. Indeed, there have been a number of reported cases where lap children have been severely injured after becoming dislodged from their parent's lap because of turbulence or a sudden drop in altitude. These injuries could have been prevented if the child was wearing a seatbelt or was otherwise secured to the seat.

Child restraints for protecting children are disclosed in U.S. Pat. Nos. 3,321,247; 3,295,501; 2,888,063; 2,877,833; 2,817,393; 2,429;283; and 1,551,932. Most of these restraints, however, are fairly complex in design, expensive to manufacture, difficult to adjust, and not easily stored when not in use. Because of the disadvantages of the existing restraints, few, if any, airlines provide safety restraints for their young passengers.

Commercial airlines may become interested in safety restraints for small passengers if a restraint could be designed which is easy to use and inexpensive to manufacture. Further, the restraint should be easy to adjust so that it can be quickly secured to and removed from a young child.

SUMMARY OF THE INVENTION

The child restraint of the present invention is inexpensive to manufacture, easy to use, durable and suitable for use in confined areas. The restraint includes a waistband which is placed around the child, adjusted for length and retained in that position by hook and napped loop means such as VELCRO. The use of hook and napped loop means permits the waistband to be easily adjusted to fit the size of any particular child, quickly secured to a child, and quickly removed from that child after use. The restraint further includes an elongated strap which is securely attached to the waistband. The strap is adapted to be looped around a suitable anchor, such as the parent's seatbelt or the armrest of the parent's seat. The end of the strap is passed around the fixed object and then threaded through a ring attached to the waistband. The strap is then pulled back across the ring so that it overlaps the portion of the strap projecting toward the ring. The overlapped portions of the strap are secured together by hook and napped loop means such as VELCRO. The device restrains the child from becoming dislodged from his parent's lap during landing and take-off or when turbulence is encountered. The restraint thus protects the child from possible severe injury.

The number of straps and belts of the present invention is kept to a minimum so that the device can be used in airplanes without unduly confining the child and/or person on whom the child is sitting. The device is also inexpensive to manufacture, easy to use, durable and capable of being compactly folded for storage, features which will be attractive to the commerical airlines and the parents of young children.

BRIEF DESCRIPTION OF THE DRAWINGS

FIG. 1 is a plan view of the child restraint of the present invention;

FIG. 2 is a perspective view of an airline seat showing the environment in which the restraint of the present invention is used;

FIG. 4 is a fragmentary, cross section of the restraint waistband taken on a line corresponding with IV—IV in FIG. 1. and;

DESCRIPTION OF THE PREFERRED EMBODIMENT

Figure 3:
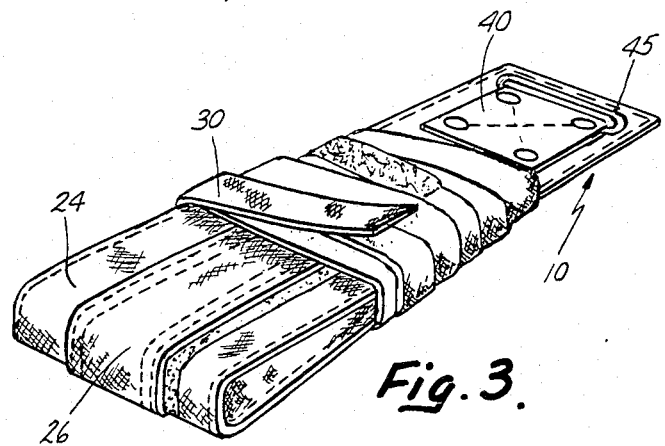
FIG. 3 is a perspective view of the restraint of the present invention when it is folded for storage.

The child restraint of the present invention is generally designated by the number 10, as shown in FIG. 1. Restraint 10 includes a waistband 20 which is wrapped around the waist of a child and a securing strap 30 which is passed around a suitable anchor such as a fastened seatbelt 80 or an armrest 60 (see FIG. 2).

Waistband 20 is formed from two pieces of cloth, each having the same shape and having their edges 22 folded over. These pieces are laid on top of each other with their folded edges seated against each other and then stitched together at 23. This construction prevents the edges of the waistband from twisting when the waistband is secured around a child's waist. Folding the edges of each piece back on the main panel of the material in the area of the stitching is the preferred construction (see fig. 4). This construction reinforces the waistband against twisting and lateral curling as a result of use. Waistband 20 is comfortable to wear because this construction prevents it from becoming narrower and more constricting during use as a result of the edges turning under the body of the waistband.

Waistband 20 is comprised of a wide portion 24 of substantial width and an elongated portion 26 of narrower width which is continuous with and an extension of the wide portion. An attachment strap 40 is attached to the outer surface of wide portion 24, adjacent to the free end thereof by suitable means such as sewing or rivets 42 or both (FIG. 3). The attachment strap 40 passes through and secures a D-ring 45.

A strip of hook material 29, or hook means, and a strip of pile material 28, or napped loop means, are suitably attached to the outer surface of waistband 20. This hook and napped loop means is commonly sold under the trademark VELCRO, a product of the Velcro Corporation. The strip of hook material 29 extends along substantially the entire length of narrow portion 26 whereas the strip of napped loop material 28 extends along substantially the entire length of wide portion 24. The hook and napped loop elements provide the means for keeping waistband 20 in place after it has been wrapped around a child.

In use, waistband 20 is wrapped around a child's waist, and the free end of the narrow portion 26 is threaded through D-ring 45. Narrow portion 26 is then pulled back across D-ring 45 so that the narrow portion and its associated hook material 29 overlaps wide portion 24 and its associated napped loop material 28. Waistband 20 is then secured by pressing the narrow portion against the wide portion which engages the hook and napped loop material.

An advantage in using hook and napped loop means is that the waistband has substantially infinite adjustability and can easily and quickly be adjusted to fit the size of any particular child. Further, the waistband can be quickly secured by simply engaging the narrow portion with the wide portion. The waistband is quickly removed by pulling the narrow portion away from its engagement with the wide portion. Thus, a parent does not have to unbuckle a buckle or untie a string to remove the waistband from the child, tasks which can potentially be difficult to quickly perform during emergency situations. In addition, the wide waistband adequately distributes the force caused by a sudden stop or turbulence over a larger portion of the child's body, thereby decreasing the likelihood of injury to the child.

Figure 5:
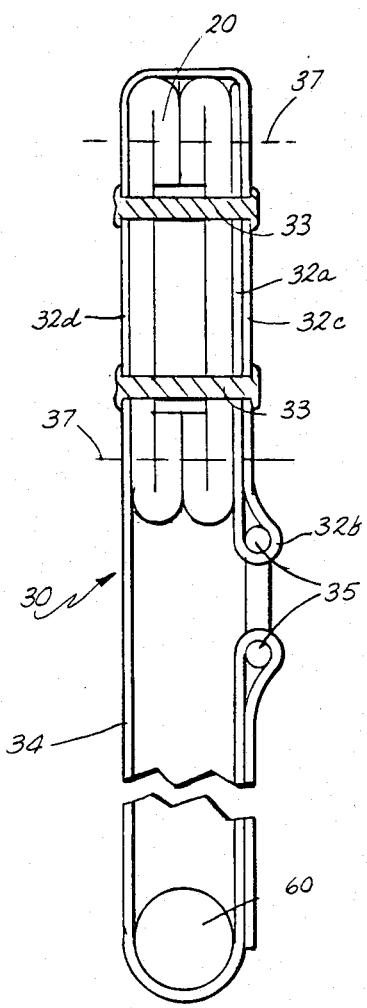
FIG. 5 is an enlarged sectional view, partially broken, taken along the plane V—V of FIG. 1.

An anchor or securing strap 30 for securing a child to a suitable anchor object is attached to wide portion 24 of the waistband 20 and extends outwardly therefrom. Preferably, strap 30 is comprised of a single strip of high strength, woven material. Strap 30 includes two distinct portions, an attached portion 32 and a free portion 34. As shown in FIG. 5, the free end of the attached portion 32, designated first attached portion 32a, extends across the width of wide portion 24, perpendicular to the longitudinal axis thereof, from the upper edge thereof to the lower edge thereof. A second attached portion, designated 32b, extends below the lower edge of the wide portion, then is doubled back upon itself, to form a loop through which is secured a D-ring 35 (see FIGS. 1 and 5). A third attached portion 32c is seated immediately upon first attached portion 32a and extends from the lower edge of the wide portion, immediately above the loop formed by portion 32b, to and over the upper edge of the wide portion. Extending from the upper edge of the wide portion to the lower edge thereof, across the inner surface of the wide portion, perpendicular to the longitudinal axis thereof, is fourth attached portion 32d. Attached portions 32a, 32c and 32d are secured to each other and to the wide portion 24, with wide portion 24 being sandwiched immediately between portions 32a and 32d, by sewing 37 and by rivets 33.

Elongated, free portion 34 is continuous with the fourth attached portion 32d and extends outwardly therefrom (see FIGS. 1 and 5). This elongated portion is adapted to be secured around a suitable anchor, such as arm rest post 60.

A second strip of hook material 36 and a second strip of pile material 38 are attached to the inner surface of the free portion 34 of strap 30. Strip 38 extends along strap 30 from an area adjacent waistband 20 to an area approximately midway between waistband 20 and the free end of strap 30. Strip 36 extends along strap 30 from an area adjacent the ends of strip 38 to the free end of strap 30. Thus, each of the hook means and the pile means extends along approximately fifty percent of the length of the free portion 34 of strap 30.

In use, waistband 20 is first wrapped around a child's waist and secured as discussed above. The free portion 34 of strap 30 is then passed around a fixed object such as an armrest 60 or a fastened seatbelt 80. The free end of the strap is then brought back toward the waistband, passed behind and then through the D-ring 35 and folded back upon.itself so that pile material 38 is presented face-to-face with hook material 36. Thus, a closed loop, having the fixed object such as a seatbelt 80 or an arm rest post 60 passing therethrough, is created by engaging the pile and hook material with each other.

When restraint 20 is in place, the child is free to move about, yet dislodgement will be controlled because he is firmly anchored by securing strap 30. If turbulence is encountered, the child cannot fall or be thrown from the parent's lap, and thus the threat of possible injury to the child will be minimized.

An advantage to the present restraint is that it is very easy to secure the restraint to both the child and to the fixed object. A minimum amount of manipulation is required to secure the restraint by the person putting the restraint in place. It is also quickly and easily released, and thus this maneuver can be performed under very difficult circumstances, such as in total darkness Further, the restraint is very durable. Attached portion 32 of strap 30 is attached to both surfaces of waistband 20, with D-ring 35 applying its load on the outer surface of waistband 20, and free portion 34 applying its load on the opposite surface. The sides of the attached portion are secured to each other, through said wide portion, by sewing 37, rivets 33 or both. Thus, when strap 30 is in place, any pull on strap 30 will be equalized between both sides of the waistband, thus decreasing the likelihood that attached portion 32 will be detached from waistband 20.

Finally, referring to FIG. 3, it will be seen that restraint 10 can be compactly folded for storage when not in use. Restraint 10 is folded by folding narrow portion 26 upon. wide portion 24 so that the hook and napped loop means are in engagement with each other. Preferably, the once folded waistband is then folded in half one more time. Subsequently, strap 30 is wrapped around the twice folded waistband. The restraint, when folded, is very compact and has no loose straps dangling therefrom. The restraint can thus be stored in small areas without becoming entangled with other restraints or with luggage. These features are very important in airplanes where space is at a minimum.

The construction and operation of the present invention, taken in connection with the accompanying drawings, will be apparent to those skilled in the art. Various changes in size, shape, proportion and details of the construction may be made without departing from the spirit of the invention and are considered as included within the scope of the appended claims.

The embodiments of the invention in which an exclusive property or privilege is claimed are defined as follows:

1. An adjustable child restraint, comprising:
   a waistband having a wide portion of substantial width merging at one end into an elongated narrow portion of reduced width, said waistband being formed from two pieces of material laid one on top of the other and seamed together along the edges thereof;
   an anchor strap attached to said wide portion of said waistband adjacent to a free end thereof;
   a first D-ring secured to said anchor strap for receiving said narrow portion of said waistband after said wide portion is wrapped around a child's waist;
   a first hook means and a first napped loop means attached to the outer surface of said waistband wherein said first hook means is attached to the outer surface of one of said narrow and wide portions and said first napped loop means is attached to the outer surface of the other of said narrow and wide portions, whereby said waistband, after being wrapped around a child's waist, may be secured in place by threading said narrow portion through said first D-ring and doubling back said narrow portion over said wide portion so that said first hook and said first loop means on said portions can be engaged;

an elongated securing strap for looping around an anchoring object, said securing strap having an attached end, an attached portion, a free portion and a free end, wherein said attached end is attached to one surface of said wide portion near a lateral edge thereof adjacent said first D-ring; said attached portion extending across the outer surface of said wide portion and being doubled back through a second D-ring adjacent the opposite lateral edge of said wide portion, and then passed back over itself and folded over the first lateral edge and then across the opposite face of said wide portion;

said second ring being adapted to receive said free end of said strap after said free portion of said strap has been looped around an anchor object; and a second hook means and a second napped loop means wherein said second hook means is attached to and extends along approximately half the length of said free portion of said securing strap and said second napped looped means is attached to and extends along the other half of the length of said free portion, whereby said securing strap is secured after being looped around an anchor object and passed behind and through said second D-ring by engagement with said second hook means on the one half of said free portion with said second napped loop means on the other half of said free portion.

* * * * *